Patented Dec. 21, 1937

2,103,017

UNITED STATES PATENT OFFICE 2,103,017

BASIC DERIVATIVES OF CYCLIC ETHER-LIKE COMPOUNDS

Bruno Pützer and Fritz Schönhöfer, Wuppertal-Elberfeld, Germany, assignors to Winthrop Chemical Company, Inc., New York, N. Y., a corporation of New York No Drawing. Application October 17, 1931, Serial No. 569,536. In Germany October 23, 1930

12 Claims. (Cl. 260—128)

The present invention relates to new basic derivatives of cyclic ether-like compounds, being therapeutically valuable substances.

In accordance with the present invention substances of anaesthetic and amoebicidal action are obtained by the production in accordance with the methods hereinafter indicated of such basic derivatives of cyclic ether-like compounds wherein a six-membered nucleus is linked to a second, at most bicyclic ring-system by means of at most two ether-like bound oxygen- or sulfur atoms, said nuclei containing at least one primary or secondary amino group which is substituted by at least one organic radical containing at least one nitrogen atom in strongly basic linkage, and which nuclei may be further substituted by monovalent substituents such as halogen, saturated and unsaturated alkyl, alkoxy, aryloxy, amino- and alkylaminoalkoxy, nitro, amino, alkyl- and acyl-amino. Accordingly the essential characteristics of our new pharmaceutically valuable products are on the one hand the combination of a six-membered nucleus by means of one or two ether-like bound oxygen or sulfur atoms with a second ring system which does not contain more than two nuclei, on the other hand the presence of at least one primary or secondary amino group in the nuclei which primary or secondary amino group is substituted by a strong basic organic radical containing nitrogen. In details the said basic derivatives may undergo numerous variations as hereinafter will be explained by the numerous examples. By the said variations the therapeutic action may be differentiated in details and into the direction desired in the individual case.

As the six-membered nucleus above mentioned preferably the benzene ring may be considered, however, also hydrogenated benzene nuclei and heterocyclic nuclei, for example, the pyridine ring may be present in our new compounds. The other nucleus combined with the six-membered nucleus by at most two ether-like bound oxygen or sulfur atoms is likewise preferably the benzene nucleus, but also in this case hydrogenated benzene nuclei and heterocyclic nuclei, such as the pyridine and piperidine nucleus, furthermore bicyclic ring systems, such as the naphthalene, quinoline, tetrahydroquinoline and benzimidazole radical are suitable for the production of our new therapeutically valuable basic derivatives of cyclic ether-like compounds. The cyclic radicals may be combined with each other by one oxygen- or sulfur atom as, for example, in the diphenyl-ethers or -thioethers, or may be further combined by a second oxygen or sulfur atom, as, for example, in the diphenylene dioxides or -disulfides, or may be combined in addition to the ether-like oxygen- or sulfur linkage, by a direct carbon linkage as, for example, in the diphenylene oxide.

The amino group substituted by an organic radical, containing nitrogen in a strong basic linkage, may be a substituent of the said nuclei or may be a member of the said nuclei in form of a secondary amino group. The substituted primary or secondary amino group must be present at least once. Its essential function in our new products is to give them a strong basic character. Accordingly the constitution of this basic side chain may show very different variations provided that always the basic character of the nitrogen atom contained in the side chain is not diminished by an acid substituent attached to the said nitrogen atom or to the side chain. We prefer to use as basic substituents of the primary or secondary amino group aminoalkyl or alkylaminoalkyl groups, such as the amino- or dimethylamino-methyl-, the diallyl-amino-ethyl-, the $\alpha, \gamma$-bis(diethylamino)-propyl group, the N-diethylaminoethyl-ethylaminoethyl group and the like. These groups may contain non acid substituents, for example, the hydroxy- or alkoxy group and they may be interrupted by ether-like bound oxygen or sulfur atoms as, for example, in the $\alpha$-diallylamino-$\beta$-hydroxy-propyl-, the dimethylaminoethoxyethyl- and the diethylaminoethyl-thioethylether group. The nitrogen atom of the basic substituent of the primary or secondary amino group may be present also in heterocyclic linkage as, for example, in the N-piperidylethyl group or may be attached to a cyclic compound as, for instance, in the dimethylaminocyclohexyl group.

The nuclei may be further substituted by monovalent substituents, such as alkyl groups, for example, methyl-, ethyl-, isopropyl- and allyl-groups and alkoxy groups of the same kind. Furthermore phenoxy-, amino- or alkylamino-alkoxy groups, for example, the dimethylaminomethoxy- and the $\alpha$-diethylamino-$\beta$-propyloxy group, the nitro-, amino-, alkylamino- or acylamino group and halogen atoms, preferably chlorine, bromine and iodine have proved as substituents especially adapted in individual cases.

The new cyclic ethers substituted by organic radicals in the amino group in the nucleus may be obtained by introducing the organic basic radical by the customary methods into the amino group in the nucleus of such amino compounds as already contain and ether- or thioether-linkage between cyclic residues. Thus esters of amino- or N-substituted amino alcohols or amino phenols, for example, those of the hydrogen halide acids or aromatic sulfonic acids or salts thereof can be caused to act on the amino compounds of the kind specified. Instead of the said alkylating agents derivatives thereof, for example, acyl derivatives or halogen alkyl phthalimides can be caused to react and the intermediate products thereby first obtained subsequently converted into the corresponding amino compounds. The process can also be carried out by introducing basic radicals in the known manner into the amino group in several steps, for example, by first causing an alkylene dihalide or an alkylene oxide or a halogenated alcohol to act on the cyclic amino ether and then converting the hydroxy- or halogen alkylamino derivatives thus produced in the customary manner, if necessary after esterifying the hydroxyl group, for example, by means of a hydrogen halide acid, into the corresponding cyclic amino ethers containing basic substituents in the amino group.

Instead of starting from amino compounds in which cyclic radicals are combined by an ether or thioether linkage there can likewise be used as starting materials compounds containing rings linked after the manner of an ether or thioether, which compounds contain instead of the amino group replaceable substituents in the nucleus. In such compounds the reactive substituents, for example, ester like groups, such as halogen or the toluene sulfonic acid radical can be replaced by the customary methods by reaction with primary or secondary amines containing a basic radical of the above indicated kind as substituent. The replaceable substituents can in their turn be activated by other substituents.

Furthermore, cyclic compounds which besides one or more amino groups containing a basic radical as substituent likewise contain hydroxyl groups (see U. S. A. Patent No. 1,757,394) or sulfhydryl groups can be converted in the known manner by the action of cyclic compounds possessing reactive substituents, such as for example, hydrogen halide- or toluene sulfonic acid esters of cyclic hydroxyl compounds or cyclic diazo compounds into the cyclic ethers or thioethers containing one or more amino groups substituted by a basic radical. The same result is attained when moreover cyclic compounds containing hydroxyl or sulfhydryl groups as substituents are caused to act on cyclic compounds, which besides basically substituted amino groups also contain replaceable substituents, for example, halogen atoms, diazo groups and the radicals of aromatic sulfonic acids. An ether-like or thioether-like linkage of the kind mentioned can also be effected between such ring systems as are already combined through a carbon linkage or an ether linkage.

Finally the thioether like compounds can likewise be produced by the customary methods when sulfur chlorides are caused to act on aromatic or heterocyclic compounds, containing an amino group substituted by an organic basic radical or when cyclic compounds containing reactive groups as substituents in the nucleus and containing basically substituted amino groups in the nucleus are caused to react with metallic sulfides.

The new basic derivatives of the cyclic etherlike compounds specified are in general colorless to yellowish oils which may be distilled in vacuo. They are insoluble in water, but dissolve in organic solvents. With acids, for example, hydrochloric, hydrobromic, sulfuric, acetic, lactic and other organic acids, they yield neutral salts, which in general are soluble in water.

The invention is illustrated by the following examples, but it is obvious from the above explanations that the invention is not restricted to these examples nor to the specific details given therein, since the invention is capable of a manifold variation in accordance with the directions above indicated:

*Example 1.*—A solution of 14 grams of diethylaminoethylchloride in 20 ccs. of benzene is dropped slowly into a boiling solution of 18.5 grams of 4-aminodiphenylether in 30 ccs. of benzene. The mixture is maintained at the boil for several hours. After cooling the benzene layer is separated from the viscous reaction product, the latter is dissolved in water and rendered alkaline. The 4-diethylaminoethylamino-diphenylether is dissolved in ether. It distils under 1 mm. pressure as a light yellow oil at 175° C. Its hydrochloride is colorless and very hygroscopic. In an analogous manner are obtained in the form of almost colorless oils the 2-diethylaminoethylamino-diphenylether (boiling under 1 mm. pressure at 158° C.) the 3-diethylaminoethylamino-diphenylether (boiling under 1.5 mm. pressure at 176° C.), the 4-dimethylaminoethylamino-diphenylether (boiling under 1 mm. pressure at 165° C.), the 4-methylaminoethylamino-diphenylether (boiling under 1 mm. pressure at 163° C.), the 4-aminoethylamino-diphenylether (boiling under 1 mm. pressure at 160° C.), the 2-diethylaminoethylamino-4-nitro-diphenylether (boiling under 1 mm. pressure at 195° C.) and by reduction of the latter the 2-diethylaminoethylamino-4-amino-diphenylether (boiling under 1 mm. pressure at 186° C.).

From the 4-diethylaminoethylamino-diphenylether in an analogous manner are obtained, for example, the 2'-methyl-(boiling point under a pressure of 0.5 mm. 185° C.), 3'-methyl-(boiling point under a pressure of 1 mm. 205° C.), 4'-methyl-(boiling point under a pressure of 0.5 mm. 186° C.), 3',5'-dimethyl-(boiling point under a pressure of 0.5 mm. 191° C.), 2'-isopropyl-5'-methyl-(boiling point under 0.5 mm. pressure 193° C.), 2'-methoxy-4'-allyl-(boiling point under 2 mm. pressure 224° C.) and 2-chloro-3',5'-dimethyl-(hydrochloride, melting point 200° C.)- compounds. They yield with mineral acids, for instance, hydrochloric or hydrobromic acid water-soluble salts.

The compounds of this class which are substituted twice by the diethylaminoethyl radical are obtained when 1 mol. of the corresponding amino compound in 400 ccs. of nitrobenzene is heated with 2 to 2.5 mol. of diethylamino-ethylchloride for 10 hours at 120–130° C. The nitrobenzene is blown off with steam while the reaction is acid to Congo Red, if necessary, the unconsumed starting material is removed with ether from the acetic acid solution and the reaction product is taken up with ether after the mixture is rendered alkaline. By fractional distillation alone a complete separation from the monosubstituted base which always appears as by-product is not possible. The crude product still containing the mono-substituted compound is then heated on the boiling water bath for two hours with some benzene and about 20% more than the quantity of phthalic anhydride calculated on the analytically ascertained content of the mono-substitution product. After the addition of a little more dilute caustic soda solution than the quantity calculated for the phthalamic acid formed, the mixture is shaken with ether. From the alkaline solution the phthalamic acid may be precipitated with dilute acetic acid and by saponifying according to customary methods the pure monosubstituted base is obtained. In the ethereal solution the di-substituted base is found together with a small quantity of phthalic anhydride. The base is further purified by shaking with dilute hydrochloric acid from which it is again extracted with ether after rendering alkaline. On distilling the ether residue the analytically pure disubstituted base is obtained. For this separation also all other methods customary for the separation of secondary and tertiary amines, for example, by means of chlorosulfonic acid, may be applied.

In this manner in the form of almost colorless oils from the 4-(bis-diethylaminoethylamino)-diphenyl-ether are obtained the 2'-methyl-(boiling point under a pressure of 0.5 mm. 197° C.), 3'-methyl-(boiling point under a pressure of 1 mm. 220° C.), 4'-methyl-(boiling point under a pressure of 0.5 mm. at 203° C.), 3',5'-dimethyl-(boiling point under a pressure of 0.5 mm. 212° C.), 2'-methyl-5'-isopropyl-(boiling point under a pressure of 0.5 mm. 213° C.), 2'-isopropyl-5'-methyl-(boiling point under a pressure of 0.5 mm. 208° C.), 2-chloro-3',5'-dimethyl-(boiling point under a pressure of 1 mm. 217° C.), 2'-methoxy-4'-allyl- (boiling point under a pressure of 1 mm. 224° C.) and 3'-acetylamino-(boiling under 1 mm. pressure at 255° C.)-compounds.

*Example 2.*—37 grams of 4-amino-diphenyl-ether, 32 grams of α-diethyl-amino-δ-bromopentane-hydrobromide (prepared by reacting upon α-diethylamino-δ-pentanol, see U. S. Patent No. 1,747,531, Example 3, with hydrobromic acid) and 25 ccs. of water are melted together for 8 hours at 120–130° C. The reaction product is dissolved in dilute hydrochloric acid, set free by means of alkali and dissolved in ether. After drying and evaporating the ether the excess of 4-amino-diphenylether is separated by fractionation. The 4-(α-diethylamino-δ-pentyl-amino)-diphenyl-ether distils under 1 mm. pressure at 196° C. as a light yellow oil. It yields a colorless, strongly hygroscopic hydrochloride.

In an analogous manner are obtained as light colored oils the 2-(α-diethylamino-δ-pentylamino)-diphenylether (boiling under 1 mm. pressure at 173° C.), the 3-(α-diethyl-amino-δ-pentylamino)-diphenylether (boiling under 0.5 mm. pressure at 187° C.), the 4-(α-diethylamino-δ-pentylamino)-2'-methoxydiphenylether (boiling under 1 mm. pressure at 231° C.), the 4-(α-diethylamino-δ-pentylamino) - 3' - methoxy-diphenylether (boiling under 2 mms. pressure at 223° C.), the 4-(α-diethylamino-δ-pentylamino)-4'-methoxy-diphenyl-ether (boiling under 1 mm. pressure at 223° C.), and the 4-(α-diethylamino-δ-pentylamino)-4'-diethylaminoethoxy-diphenylether (boiling under 1 mm. pressure at 235° C.).

*Example 3.*—46 grams of 2,4-diamino-2'-methoxy-diphenylether (melting point 106° C., obtained by the reaction of the sodium salt of guaiacol with 2,4-dinitro-chlorobenzene and reduction of the resulting dinitro compound), 32 grams of diethylamino-δ-bromo-pentane-hydrobromide and 25 ccs. of water are melted for 8 hours at 120–130° C. The working up follows as in Example 2. The new 2,4-bis-(α-diethylamino-δ-pentylamino)-2'-methoxy-diphenylether distils under 1 mm. pressure as a yellow oil at 233° C. Its colorless hydrochloride is hygroscopic.

The corresponding 3'-methoxy compound boils under 1.5 mm. pressure at 250° C., the corresponding 3'-ethoxy compound boils under 1 mm. pressure at 252° C.

*Example 4.*—41 grams of 2,4-diaminophenyl-cyclohexylether (boiling point under 1 mm. pressure 181° C., obtained by the reaction of the potassium salt of cyclohexanol with 2,4-dinitrochlorobenzene and reduction of the dinitro compound), 32 grams of α-diethylamino-δ-bromopentane-hydrobromide and 25 ccs. of water are melted for 8 hours at 120–130° C. The working up follows as in Example 2. The new 2,4-bis-(α-diethylamino-δ-pentylamino) - phenyl - cyclohexylether distils under 1 mm. pressure at 240° C. as a yellow oil. Its pale yellow colored hydrochloride is hygroscopic.

*Example 5.*—37 grams of 5-amino-2-phenoxy-pyridine (melting point 71° C., obtainable by the reaction of sodium phenate with 2-chloro-5-nitropyridine and reduction of the resulting nitro compound of the melting point 93° C.), 32 grams of α-diethylamino - δ - bromopentane - hydrobromide and 25 ccs. of water are melted together for 8 hours at 120–130° C. After cooling, the reaction product is dissolved in dilute hydrochloric acid, and, to remove the excess of aminoether, neutralized by the addition of sodium acetate and then extracted with ether. From the acetic acid solution the 5-(α-diethylamino-δ-pentylamino)-2-phenoxy-pyridine formed is set free by means of alkali and dissolved in ether. It is a light green, fluorescent and readily oxidizable oil, boiling under 1 mm. pressure at 213° C.

The 5-diethylaminoethylamino-2-phenoxypyridine is produced in an analogous manner and boils under 1 mm. pressure at 202° C. as a yellow oil.

*Example 6.*—16.1 grams of sodium ortho-nitrophenate and 15.9 grams of 2-chloro-5-nitropyridine are heated in 150 ccs. of absolute alcohol for 4 days under a reflux condenser. The crystals deposited are filtered, washed repeatedly with water and crystallized from alcohol. The dinitro compound is colorless and melts at 135° C. By reduction the diamino compound is obtained therefrom as a light yellow viscous oil, (boiling under 1 mm. pressure at 211° C.). This is converted into 3 - diethylaminoethylamino - 6 - (2' - diethylaminoethylamino-phenoxy) - pyridine by reaction with diethylaminoethylchloride as described in Example 1. The latter product distils under 1 mm. pressure as a yellow viscous oil at 249° C.

*Example 7.*—70 grams of para-phenoxy-ortho-nitraniline (melting point at 103° C. obtainable by nitration of para-phenoxyacetanilide and deacetylation of the resulting nitro compound), 43 grams of arsenic acid and 120 ccs. of glycerol are heated to 130–140° C. and 40 ccs. of concentrated sulfuric acid are run in quickly. The mixture is maintained at 140° C. for some 8 hours with stirring. After dilution with water it is rendered alkaline and filtered. The crude product is crystallized first from acetone with animal charcoal and then from methylalcohol. The pure 6-phenoxy-8-nitroquinoline melts at 142° C. Reduction by the customary methods yields 6-phenoxy-8-aminoquinoline of the boiling point of 206° C. under 2 mm. pressure and melting point of 56° C. 23.6 grams of 6-phenoxy-8-aminoquinoline are melted with 13.5 grams of diethylaminoethylchloride for 8 hours at 130–140° C. After dissolving the melt in dilute hydrochloric acid the solution is rendered alkaline and the 8-diethylaminoethylamino-6-phenoxyquinoline obtained is dissolved in ether. It distils under 2 mm. pressure as a light yellow oil at 235° C. Its hydrochloride is pale yellow in color and hygroscopic.

*Example 8.*—18.5 grams of para-aminodiphenylether, 5 grams of para-nitrodiphenylether, 7.5 grams of arsenic acid and 43 ccs. of glycerol are heated to 130–140° C. 14.2 ccs. of concentrated sulfuric acid are then run in and the mixture is maintained at 140° C. for some 8 hours. After the addition of an equal volume of water the mixture is boiled with animal charcoal and filtered. Sodium acetate is added to the filtrate and the 6-phenoxyquinoline which separates is dissolved in ether. It distils under 1.5 mm. pressure at 170° C. as a light colored oil. By reduction by means of sodium in alcohol 1,2,3,4-tetrahydro-6-phenoxyquinoline is obtained therefrom as a light yellow oil boiling under 1.5 mm. pressure at 197° C. The alkylation by means of diethylaminoethylchloride is carried out in a manner analogous to that described in Example 1. The resulting 1 - diethylaminoethyl - 1,2,3,4 - tetrahydro-6-phenoxyquinoline boils under 1 mm. pressure at 222° C. as a yellow readily oxidizable oil. Its pale yellow colored hydrochloride is hygroscopic.

*Example 9.*—18.3 grams of 2-aminodiphenylene-oxide (compare Ber. 56, page 2498) are heated to boiling for 6 hours with 14 grams of diethylaminoethylchloride in 40 ccs. of benzene. After pouring off the benzene layer the residue is dissolved in water, rendered alkaline and the base dissolved in ether.

The 2-diethylaminoethylamino-diphenyleneoxide is a nearly colorless, highly refracting oil. It boils under 1.5 mm. pressure at 206° C. and solidifies to colorless crystals, melting at 35° C. 28 grams of the base are melted with 28 grams of diethylaminoethylchloride for 14 hours at 120–130° C. The melt is then dissolved in water and after the addition of alkali to the solution the 2 - bis-(diethylaminoethyl) -aminodiphenylene-oxide is dissolved in ether. It boils under 1 mm. pressure at 225° C. as a light yellow oil.

In an analogous manner are obtained as light colored oils the 2-(diethylaminoethoxyethylamino)-diphenylene-oxide (boiling under 1 mm. pressure at 235° C.; the diethylaminoethoxyethylchloride required for the preparation of which is described in Brit. spec. No. 286,087, page 1, line 48 et sequ.), the 2-[bis-(diethylaminoethoxyethyl)-amino]-diphenylene-oxide (boiling under 1 mm. pressure at 260–262° C.), the (diphenyleneoxide - 2 - aminoethyl) - diethylaminoethyl-thioether (boiling under 1 mm. pressure at 226° C. prepared by reacting upon 2-amino-diphenyleneoxide with diethylaminoethylthioethyl-chloride $(C_2H_5)_2N—CH_2—CH_2—S—CH_2.CH_2—Cl$, which latter is described in Brit. spec. No. 286,087, page 2, line 24 et sequ.), the 2,7-bis-(diethylaminoethylamino)-diphenylene-oxide (boiling under 1 mm. pressure at 255–260° C.), and the 2-[bis-(N-piperidylethyl)-amino]-diphenylene-oxide (boiling under 1 mm. pressure at 250–260° C.), 2-(N-piperidylethylamino)-diphenylene-oxide forms colorless crystals melting at 87° C., the 2-(gamma-N-piperidyl-beta-hydroxypropylamino)-diphenylene-oxide forms colorless crystals melting at 159° C.

*Example 10.*—0.1 mol. of bromo-2-aminodiphenylene-oxide is heated for 10 hours to 120–130° C. with 40 ccs. of nitrobenzene and 0.15 mol. of diethylaminoethylchloride. After working up the reaction product the 2-diethylaminoethylaminobromodiphenylene-oxide is obtained from alcohol in a more than 70% yield forming colorless crystals of the melting point of 66° C.

The bromo-2-aminodiphenylene-oxide (melting point 133° C.) is obtained by saponifying 2-acetylaminodiphenylene-oxide (melting point 192° C.), produced by brominating 2-acetyl-aminodiphenylene-oxide.

*Example 11.*—19.8 grams of 1,3-diaminodiphenylene-dioxide (Am. Chem. Journ. 26, page 362) are heated to boiling for 6 hours with 28 grams of diethylaminoethylchloride in 60 ccs. of benzene. The working up is effected in the manner analogous to that described in Example 1 and leads to 1,3-bis-(diethylaminoethylamino)-diphenylene-dioxide, a light yellow oil, boiling under 1 mm. pressure at 255° C.

*Example 12.*—20 grams of 2-aminodiphenylsulfide, 16 grams of alpha-diethylamino-deltabromopentane-hydrobromide and 13 ccs. of water are melted together for 8 hours at 110° C. Dilute hydrochloric acid is added to the melt and the excess 2-aminodiphenyl-sulfide is filtered off from the hydrobromide, which separates in a crystallized form. The filtrate is rendered alkaline and the 2-(alpha-diethylamino-delta-pentylamino)-diphenyl-sulfide formed is dissolved in ether. It boils at 200° C. under 1 mm. pressure as a light colored oil. Its hydrochloride is very hygroscopic.

In an analogous manner are obtained in the form of nearly colorless oils the 4-(alpha-diethylamino-delta-pentylamino)-diphenyl-sulfide, boiling under 1 mm. pressure at 218° C., the 4-(alpha-diethylamino-delta-pentylamino)-4'-methoxydiphenylsulfide, boiling under 1 mm. pressure at 236° C., the 4-diethylaminoethylamino - diphenylsulfide, boiling under 1 mm. pressure at 205° C., the 4 - (bis-diethylaminoethyl - amino) - diphenylsulfide, boiling under 1 mm. pressure at 227° C., the 4-diethylaminoethylamino-2' - methoxydiphenylsulfide, boiling under 1 mm. pressure at 220° C., the 4-diethylaminoethylamino - 2 - methoxy - diphenylsulfide, boiling under 1 mm. pressure at 223° C., the 4-diethylaminoethylamino-4'-methyldiphenylsulfide, boiling under 1 mm. pressure at 212° C., the 2-diethylaminoethylamino-diphenylsulfide, boiling under 1 mm. pressure at 175° C., the 2 - diethylaminoethylamino - 4' - methyldiphenylsulfide, boiling under 1 mm. pressure at 194° C., the 2-diethylaminoethylamino-4-methoxy-4'-methyldiphenylsulfide, boiling under 1 mm. pressure at 212° C., the 2-diethylaminoethylamino-4,5 - dimethoxy-4'-methyldiphenylsulfide, boiling under 1 mm. pressure at 207° C., the 2-(bis-diethylaminoethyl-amino) - 4,5 - dimethoxy-4'-methyldiphenylsulfide, boiling under 1 mm. pressure at 220° C., the 4-(N-piperidyl-ethylamino)-diphenylsulfide, boiling under 1 mm. pressure at 230° C. and melting at 74° C., and the 2 - m e t h o x y - 4 - diethylaminoethylamino - 4'- methyl-diphenylsulfide, boiling under 1 mm. pressure at 237° C. The said bases yield with acids, for example, hydrochloric, sulfuric or acetic acid, water-soluble salts.

The amino-diphenylsulfides required as starting materials for the compounds employed above are prepared by reacting upon sodium thiophenolates substituted accordingly, with ortho- and para-halogen-nitrobenzenes or substitution products thereof in boiling alcoholic solution, and reducing the nitrodiphenylsulfides formed in the customary manner.

*Example 13.*—To a solution of one molecular proportion of sodium thiophenate in 500 ccs. of boiling alcohol are added 4 grams of copper bronze and then in small portions one molecular proportion of 2-chloro-5-nitropyridine. After the reaction, which is at first vigorous, has ceased, boiling is continued for 1 hour. The small quantity of 2-chloro-5-nitropyridine, which has not entered into reaction, is removed by steam distillation. The reaction product is filtered from the residue and crystallized from alcohol. There are obtained colorless crystals, melting at 121° C. The nitro compound is reduced by means of stannous chloride in concentrated hydrochloric acid to the corresponding amino compound, which melts at 120° C. 20.2 grams of the amino compound are heated to boiling for several hours with 14 grams of diethylaminoethylchloride in 80 ccs. of benzene. Water is then added and the aqueous layer separated from the benzene layer. The former is rendered alkaline. After extraction with ether the (5-diethylaminoethylamino-pyridyl-2)-phenylsulfide is obtained as a yellow, readily oxidizable oil, boiling under 1 mm. pressure at 203° C. From the benzene layer is obtained besides a little amino compound which has not entered into reaction the 5-(bis-diethylamino-ethylamino)-pyridyl-2-phenylsulfide in the form of a yellow oil, boiling under 1 mm. pressure at 224° C.

*Example 14.*—20 grams of 3,4-diaminodiphenyl-ether are heated to 170–180° C. for 20 hours with 18.7 grams of gamma-diethylamino-normal-butyric acid ethylester (boiling point 105° C. under 20 mm. pressure; is prepared by reacting upon sodium malonic acid ester with diethylamino-ethylchloride, saponifying the condensation product formed, splitting off carbon dioxide from the dicarboxylic acid obtained by heating with hydro-bromic acid (spec. grav. 1.5) for 6 hours and esterification of the gamma-diethylamino-butyric acid hydrobromide produced with ethylalcohol). Alcohol and water formed in the reaction distil off. The residue is fractionated in a high vacuum. The resulting 2-gamma-diethylamino-propyl-5-phenoxy-benzimidazole is a light colored oil, which boils under 1 mm. pressure at 249° C.

*Example 15.*—0.1 mol. of (5-aminopyridyl-2)-quinolyl-2'-sulfide is heated for 10 hours to 120–130° C. with 80 ccs. of nitrobenzene and 14 grams of diethylaminoethylchloride. On working up the reaction mixture in addition to a large quantity of quaternary salts the (5-diethylaminoethyl-amino-pyridyl-2)-quinolyl-2'-sulfide is obtained as a viscous yellow oil, boiling point 275° C. under 3 mm. pressure.

The (5-aminopyridyl-2)-quinolyl-2'-sulfide (melting point 144° C.) is obtained from the (5-nitropyridyl-2)-quinolyl-2'-sulfide (melting point 127° C.), by reduction with iron in dilute acetic acid. The latter is produced by condensing the sodium salt of 2-mercaptoquinoline with 2-chloro-5-nitropyridine.

*Example 16.*—21.6 grams of 2-chloro-dicyclohexylether are heated for 4 hours to 120–140° C. with 21.5 grams of bis-diethylaminoethylamine. After cooling, the mixture is dissolved in dilute hydrochloric acid, filtered, rendered alkaline with soda lye and extracted with ether. The ethereal solution is dried with calcined potash, filtered and the ether is distilled off on the water bath. The residue is fractionated. The 2-(bis-diethyl-aminoethylamino)-dicyclohexylether is a light oil, boiling at 180–185° C. under a pressure of 1 mm.

The 2-chloro-dicyclohexylether is obtained as a colorless oil, boiling at 108–112° C. under a pressure of 3 mm., by condensation of cyclohexa-nol with 2-chloro-cyclohexanone while heating to 130–140° C. in the presence of potassium carbonate, reduction of the 2-oxo-dicyclohexylether (boiling point under a pressure of 3 mm. 110–115° C.) with sodium and alcohol and chlorination of the hydroxy-dicyclohexylether formed (boiling point under a pressure of 3 mm. 120–130° C.) in the presence of dimethylaniline by means of thionylchloride in benzene solution.

*Example 17.*—10 grams of phenol, 12 grams of sodium phenolate and 23 grams of 4-amino-3-nitrodiphenylether are heated for 16 hours to 160–175° C. whereby ammonia escapes. After the reaction is complete, the mixture is repeatedly extracted with dilute soda lye, the reaction product is then filtered with suction and repeatedly washed with water. The reaction product thus obttained is slowly introduced into a boiling hot mixture of 75 grams of iron powder, 500 ccs. of water and 5 ccs. of acetic acid. After the reaction is complete the mixture is rendered alkaline with dilute sodium carbonate solution and filtered with suction. The residue is extracted with ether. The ethereal solution is evaporated and the residue melted with 13 grams of diethylamino-ethylchloride for 8 hours at 130–140° C. After cooling, the mixture is dissolved in water, rendered alkaline with soda lye and the separating oil taken up in ether. The ethereal solution is dried with calcined potassium carbonate, filtered and the ether is distilled off. The residue is subjected to fractional distillation. The 2-diethylamino-ethylamino-hydroquinone-1,4-diphenyl-ether is a viscous yellow oil of the boiling point of 262° C. under a pressure of 0.5 mm.

*Example 18.*—24.4 grams of 2-amino-7-methyl-diphenylene-disulfide (compare Annalen 468, page 162) are heated to boiling for 6 hours in 60 ccs. of benzene with 14 grams of diethylamino-ethylchloride. The hydrochloride of the reaction product separates in part. It is dissolved in a large quantity of water. The aqueous solution is extracted with ether in order to remove the starting materials still present, then rendered alkaline and the new base taken up in ether. The 2-diethylaminoethylamino-7-methyl-diphenylene-disulfide forms a colorless viscous oil, boiling at 235° C. under 1 mm. pressure.

We claim:—

1. Basic derivatives of cyclic ethers of the formula:

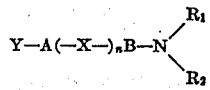

wherein A stands for a radical of the class of six membered ring compounds, B stands for a radical of the class of at most bicyclic nuclear compounds, X stands for a member selected from the group consisting of oxygen and sulfur, the free linkages of each X being attached to nuclear carbon atoms of A and B, $n$ stands for one of the numbers 1 and 2, $R_1$ stands for a member selected from the class consisting of aminoalkyl and alkylaminoalkyl groups, $R_2$ stands for a member selected from the group consisting of hydrogen, aminoalkyl and alkylaminoalkyl, Y stands for one of the groups hydrogen and

wherein $R_1$ and $R_2$ stand for the same substituents as defined above, said cyclic ethers being strong bases which are insoluble in water, soluble in organic solvents, yielding with acids salts which in general are soluble in water and are suitable for pharmaceutical purposes.

2. Basic derivatives of cyclic ethers of the formula:

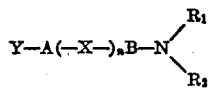

wherein A and B stand for radicals of the class of six membered ring compounds, X stands for a member selected from the group consisting of oxygen and sulfur, the free linkages of each X being attached to nuclear carbon atoms of A and B, $n$ stands for one of the numbers 1 and 2, $R_1$ stands for a member selected from the class consisting of aminoalkyl and alkylaminoalkyl groups, $R_2$ stands for a member selected from the group consisting of hydrogen, aminoalkyl and alkylaminoalkyl, Y stands for one of the groups hydrogen and

wherein $R_1$ and $R_2$ stand for the same substituents as defined above, said cyclic ethers being strong bases which are insoluble in water, soluble in organic solvents, yielding with acids salts which in general are soluble in water and are suitable for pharmaceutical purposes.

3. Basic derivatives of cyclic ethers of the formula:

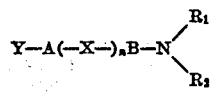

wherein A stands for a radical of the benzene series, B stands for a radical of the class of at most bicyclic nuclear compounds, X stands for a member selected from the group consisting of oxygen and sulfur, the free linkages of each X being attached to nuclear carbon atoms of A and B, $n$ stands for one of the numbers 1 and 2, $R_1$ stands for a member selected from the class consisting of aminoalkyl and alkylaminoalkyl groups, $R_2$ stands for a member selected from the group consisting of hydrogen, aminoalkyl and alkylaminoalkyl, Y stands for one of the groups hydrogen and

wherein $R_1$ and $R_2$ stand for the same substituents as defined above, said cyclic ethers being strong bases which are insoluble in water, soluble in organic solvents, yielding with acids salts which in general are soluble in water and are suitable for pharmaceutical purposes.

4. Basic derivatives of cyclic ethers of the formula:

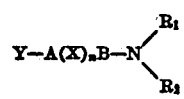

wherein A stands for a radical of the benzene series, B stands for a radical of the class of six ring compounds, X stands for a member selected from the group consisting of oxygen and sulfur, the free linkages of each X being attached to nuclear carbon atoms of A and B, $n$ stands for one of the numbers 1 and 2, $R_1$ stands for a member selected from the class consisting of aminoalkyl and alkylaminoalkyl groups, $R_2$ stands for a member selected from the group consisting of hydrogen, aminoalkyl and alkylaminoalkyl, Y stands for one of the groups hydrogen and

wherein $R_1$ and $R_2$ stand for the same substituents as defined above, said cyclic ethers being strong bases which are insoluble in water, soluble in organic solvents, yielding with acids salts which in general are soluble in water and are suitable for pharmaceutical purposes.

5. Basic derivatives of cyclic ethers of the formula:

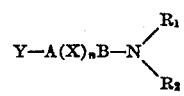

wherein A and B stand for radicals of the benzene series, X stands for a member selected from the group consisting of oxygen and sulfur, the free linkages of each X being attached to nuclear carbon atoms of A and B, $n$ stands for one of the numbers 1 and 2, $R_1$ stands for a member selected from the class consisting of aminoalkyl and alkylaminoalkyl groups, $R_2$ stands for a member selected from the group consisting of hydrogen, aminoalkyl and alkylaminoalkyl, Y stands for one of the groups hydrogen and

wherein $R_1$ and $R_2$ stand for the same substituents as defined above, said cyclic ethers being strong bases which are insoluble in water, soluble in organic solvents, yielding with acids salts which in general are soluble in water and are suitable for pharmaceutical purposes.

6. Basic derivatives of cyclic ethers of the general formula:

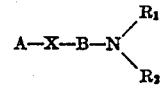

wherein A and B stand for radicals of the benzene series, X stands for a member selected from the class consisting of oxygen and sulfur, $R_1$ stands for a member selected from the class consisting of aminoalkyl and alkylaminoalkyl groups, $R_2$ stands for a member selected from the class consisting of hydrogen, aminoalkyl and alkylaminoalkyl, said cyclic ethers being strong bases which are insoluble in water, soluble in organic solvents, yielding with acids salts which in general are soluble in water and are suitable for pharmaceutical purposes.

7. Basic derivatives of cyclic ethers of the general formula:

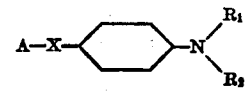

wherein A stands for a radical of the benzene series, X stands for a member selected from the class consisting of oxygen and sulfur, $R_1$ stands for a member selected from the class consisting of aminoalkyl and alkylaminoalkyl groups, $R_2$ stands for a member selected from the class consisting of hydrogen, aminoalkyl and alkylaminoalkyl, said cyclic ethers being strong bases which are insoluble in water, soluble in organic solvents, yielding with acids salts which in general are soluble in water and are suitable for pharmaceutical purposes.

8. Basic derivatives of cyclic ethers of the formula:

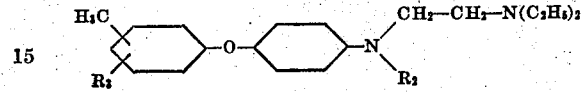

wherein $R_2$ stands for a member selected from the class consisting of hydrogen, aminoalkyl and alkylaminoalkyl, and $R_3$ stands for one of the members hydrogen and methyl, said cyclic ethers being strong bases which are insoluble in water, soluble in organic solvents, yielding with acids salts which in general are soluble in water and are suitable for pharmaceutical purposes.

9. The 4-diethylaminoethylamino-4'-methyl-diphenylether of the formula:

being an almost colorless oil of the boiling point 186° C. at a pressure of 0.5 mm., being insoluble in water and soluble in organic solvents, yielding with mineral acids water-soluble salts.

10. The 4-(bis-diethylaminoethyl-amino)-3',5'-dimethyl-diphenylether of the formula:

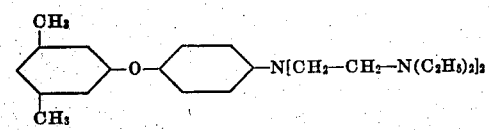

being an almost colorless oil of the boiling point 212° C. under 0.5 mm. pressure, being insoluble in water, soluble in organic solvents, yielding with mineral acids water-soluble salts.

11. Basic derivatives of cyclic ethers of the general formula:

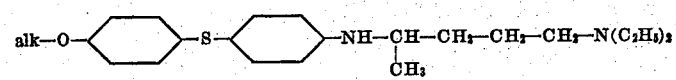

wherein alk stands for an alkyl group, said cyclic ethers being strong bases which are insoluble in water, soluble in organic solvents, yielding with acids salts which in general are soluble in water and are suitable for pharmaceutical purposes.

12. The 4-(alpha-diethylamino-delta-pentyl-amino)-4'-methoxy-diphenylsulfide of the formula:

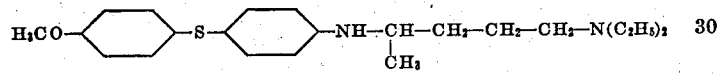

being an almost colorless oil of the boiling point 236° C. at a pressure of 1 mm., being insoluble in water, soluble in organic solvents, yielding with acids salts which in general are soluble in water and are suitable for pharmaceutical purposes.

BRUNO PÜTZER.
FRITZ SCHÖNHÖFER.